(12) United States Patent
Yashiro

(10) Patent No.: US 6,748,494 B1
(45) Date of Patent: Jun. 8, 2004

(54) DEVICE FOR CONTROLLING ACCESS TO UNITS OF A STORAGE DEVICE

(75) Inventor: Mitsuhiko Yashiro, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/531,104

(22) Filed: Mar. 17, 2000

(30) Foreign Application Priority Data

Mar. 30, 1999 (JP) .......................................... 11-088073

(51) Int. Cl.[7] .............................................. G06F 12/00
(52) U.S. Cl. ....................... 711/133; 711/134; 711/136; 711/159; 711/160
(58) Field of Search ..................... 711/133–136, 118, 711/112, 159–160, 156

(56) References Cited

U.S. PATENT DOCUMENTS 5,737,752 A * 4/1998 Hilditch ...................... 711/133
6,282,616 B1 * 8/2001 Yoshida ET AL. .......... 711/133
6,339,818 B1 * 1/2002 Olszewski ................... 711/173

OTHER PUBLICATIONS

Patent Abstracts of Japanese Publication No. 08305631, published Nov. 22, 1996.

* cited by examiner

*Primary Examiner*—Kimberly McLean-Mayo
(74) *Attorney, Agent, or Firm*—Staas & Halsey LLP

(57) ABSTRACT

A file control device having physical storage devices and logical storage devices, which prevents competition for access to the physical storage device and avoids a decline in performance. When adding a new block to the cache memory or when ejecting a block from cache memory, a block with the lowest access frequency out of data retained in a physical storage device having the lowest access frequency is determined for ejection. The file control device concurrently monitors storage device priority information in addition to data priority information to control transfer of data between the storage device and the cache memory.

19 Claims, 9 Drawing Sheets

| ENTRY NUMBER | DEVICE NUMBER | PREVIOUS | LATTER |
|---|---|---|---|
| 0 | 1 | * | 2 |
| 1 | 2 | 2 | * |
| 2 | 3 | 0 | 1 |

FIG. 5A

| ENTRY NUMBER | DEVICE NUMBER | PREVIOUS | LATTER |
|---|---|---|---|
| 0 | 1 | 2 | 1 |
| 1 | 2 | 0 | * |
| 2 | 3 | * | 0 |

FIG. 5B

| ENTRY NUMBER | PHYSICAL DEVICE NUMBER | LOGICAL DEVICE NUMBER | BLOCK | PREVIOUS | LATTER |
|---|---|---|---|---|---|
| 0 | 1 | 11 | A | 1 | * |
| 1 | 1 | 12 | B | 3 | 0 |
| 2 | 2 | 21 | C | * | 3 |
| 3 | 2 | 22 | D | 2 | 1 |

FIG. 6A

| ENTRY NUMBER | PHYSICAL DEVICE NUMBER | LOGICAL DEVICE NUMBER | BLOCK | PREVIOUS | LATTER |
|---|---|---|---|---|---|
| 0 | 1 | 11 | A | * | 2 |
| 1 | 1 | 12 | B | 3 | * |
| 2 | 2 | 21 | C | 0 | 3 |
| 3 | 2 | 22 | D | 2 | 1 |

FIG. 6B

DEVICE FOR CONTROLLING ACCESS TO UNITS OF A STORAGE DEVICE

CROSS REFERENCE TO RELATED APPLICATIONS

This application is based upon and claims priority of Japanese Patent Application No. 11-088073, filed Mar. 30, 1999, the contents being incorporated herein by reference.

BACKGROUND OF THE INVENTION

1. Field of the Invention

The present invention relates to a file control device to control an external storage device in a data processing system. More particularly, the present invention relates to a file control device suitable for controlling multiple disk storage devices.

2. Description of the Related Art

The use of magnetic disk devices and other types of storage devices to store data for computer systems is well-known. Storage devices inherently have physical storage contents, which physical storage contents may be used as a logical storage device or as multiple logical storage devices. In particular, in some computer systems, a single physical storage device may be used as a single logical storage device. In other computer systems, a single physical storage device may be used as multiple logical storage devices. Conversely, multiple physical storage devices may also be used as a single logical storage device.

For example, a file control device for a computer system may perform emulation to provide a configuration which makes it look like there are multiple small capacity logical storage devices in a large capacity physical storage device. Furthermore, a file control device may perform emulation to provide a configuration which makes it look like there is one large capacity logical storage device made up of multiple small capacity storage devices. The above-described emulation is performed when the number of physical storage devices is increased to prevent changes in the software which accesses the physical storage devices.

When a single physical storage device is used as a single logical storage device, the capacity of the logical storage device also exists in the capacity of the physical storage device. Therefore, every time that the capacity of a physical storage device is changed, the software which controls access must be revised. If the software were not revised, the software would not be capable of accessing a storage device with a new logical capacity. New types of physical storage devices are being developed every day, and because of the great many varieties of physical storage devices which exist, revising the software to correspond to the physical storage device has become a serious problem.

File control devices logically emulate devices with a specific storage capacity. If control of the logical storage device and control of the physical storage device are separated, then no problems will occur even when a physical storage device with a new capacity is connected to the file control device. Software which controls access to storage devices can handle new storage devices in the same way as the prior art devices. This is advantageous in that the software does not need to be revised.

Therefore, as the capacity of the physical storage device increases, the method whereby multiple logical storage devices are emulated in a single physical storage device has come into widespread use. In emulating the multiple logical storage devices, the software focuses on accessing the logical storage devices. As a result, the software sometimes simultaneously accesses different logical storage devices which are allocated to a single physical storage device. When this happens, a single logical storage device is read and written simultaneously and it must wait for access to other logical storage devices.

In a computer system which uses a large-scale computer, only a single access to a single storage device can be issued at one time. As a result, when a physical storage device and a logical storage device coincide, waiting for access to other logical storage devices does not occur. Therefore, when multiple logical storage devices are configured in a single physical storage device (that is, when a physical storage device and a logical storage device are separated), it looks as if the performance relative to access from the server has declined.

In order to alleviate the decline in access performance, file control devices are typically provided with a disk cache which makes it possible to make multiple accesses simultaneously. A portion of the contents of the logical storage device are stored in the disk cache.

If it is assumed, for example, that two logical storage devices are allocated to a physical storage device, and if the various data which are retained in the two logical storage devices are stored in the disk cache, then either of the data can be accessed simultaneously. However, if data which are retained in one logical storage device are stored in disk cache, and data which are retained in the other logical storage device are not stored in disk cache, then one set of data is transferred from disk cache and the other set of data, which is not stored in disk cache, is transferred from the physical disk.

As described above, by using disk cache, the server increases the possibility of simultaneously accessing data which are retained in multiple logical devices allocated to a single physical storage device. Therefore, when data read processing and data write processing are generated simultaneously between a certain physical storage device and cache memory, the possibility of simultaneously accessing data which are retained in multiple logical devices increases strikingly. The possibility of access to a single logical storage device also comes to mind.

However, the prior art disk cache control does not take into consideration multiple logical storage devices existing in a single physical storage device. More specifically, according to the prior art disk cache control, only the access frequency relative to the logical storage device is used in monitoring the data in disk cache. However, the access frequency relative to the physical storage device has not been used to monitor the data in disk cache. Therefore, there are times when the original effect cannot be obtained sufficiently in the disk cache by providing cache memory.

This problem will now be described in greater detail with reference to FIG. 9, which is a block diagram of a prior art file access device. As shown in FIG. 9, the prior art file access device includes a storage device 20 having a file control device 30, two Server InterFace Modules (SIFM) 33-1 and 33-2, k Device InterFace Modules (DIFM) 34-1 to 34-k, k physical storage devices 21-1 to 21-k, and two buses 35-1 and 35-2 for access to a cache memory 40. Furthermore, the respective single physical storage devices 21-1 to 21-k are configured of two logical storage devices (50-1, 51-1 to 50-k, 51-k).

A controller 31, which is provided in the file control device 30 of the storage device 20, comprises a control memory 41. A cache memory monitoring table 42 is stored in the control memory 41. The cache memory monitoring table 42 includes information indicating a relationship between a position (block) inside the storage device 20 in which data is stored and a position inside the cache memory 40 where a copy of that data is stored.

FIG. 10 is a diagram of a prior art cache memory monitoring table 42 used to monitor the data stored in cache memory 40. The cache memory monitoring table 42 is used to monitor block units. As described herein, a "block" is a copy of part of the data retained in the storage device 20. The cache memory monitoring table 42 has, for example, a structure in which a block entry 60 is arranged in order of priority.

One well-known method of data substitution in cache memory 40 is the "least recently used" (LRU) method. In accordance with the LRU method, a control system gives the highest priority to the data that has been most recently accessed, and gives the lowest priority to the data for which the most time has elapsed since it was last accessed.

As shown in FIGS. 9 and 10, the data in a block E of logical storage device 11 (50-1) at the left of FIG. 9 is newly stored in cache memory 40. In this case, as shown in FIG. 10, a new entry 60-1 which handles the block E is added to the cache memory monitoring table 42. Thus, the data in block A for logical storage device 11 (50-1) which corresponds to entry 60-2 with the lowest priority are ejected from cache memory 40 (in FIG. 10).

As described herein, the terminology "data are ejected from cache memory" means that the cache memory 40 is placed in a mode wherein the relevant data are logically not stored in the cache memory 40. For example, this includes the case where the file control device 30 actually recognizes the relevant area as a space area with the data itself being left in cache memory 40 as is.

The ejection of data from cache memory 40 occurs not only when the storage space in cache memory 40 is insufficient. For example, even if storage space is left in cache memory 40, the file control device 30 sometimes performs control so that data are periodically ejected from cache memory 40 to upgrade the overall performance of the storage device.

As shown at the right hand side of FIG. 10, data in block F in the logical storage device 12 (51-1) are stored anew in cache memory 40. In this case, a new entry 60-3, which corresponds to block F, is added to the cache memory monitoring table 42. Thus, entry 60-4, which corresponds to block B in the logical storage device 12 (51-1), is ejected from the cache memory monitoring table 42 (right hand side of FIG. 10).

In the state shown on the right hand side of FIG. 10, both the data in block A in logical storage device 11 (50-1) and the data in block B in logical storage device 12 (51-1) are in a state where neither of these blocks is stored in the cache memory 40. As described above, the relevant data itself sometimes exists in cache memory 40. However, the file control device 30 recognizes the area in cache memory 40 in which the data is stored as a space area. Therefore, the file control device 30 cannot actually access in the data in cache memory 40. As a result, the data are in a state wherein they are not logically stored in cache memory.

In this case, when simultaneous access to both blocks A and B is required by the server, there is competition for access to the physical storage device 1 (21-1) because both of these blocks require access to the physical storage device (21-1). Therefore, one has to wait for access to either of these blocks until access of the other is completed.

SUMMARY OF THE INVENTION

It is an object of the present invention to overcome the disadvantages noted above and to prevent the performance of cache memory from declining.

Objects and advantages of the present invention are achieved with a file control device, comprising a storage device to store data, the storage device including a plurality of memory devices; a cache memory, connected to the plurality of memory devices, to store a portion of the data stored in the storage device; and a control device to control transfer of data between the storage device and the cache memory, wherein the control device controls data transfer between the storage device and the cache memory according to cache data information indicating a relationship between a location in the storage device where the portion of the data is stored and a location in the cache memory where the portion of the data is to be retained, and according to data priority information indicating a priority rank for the data stored in the cache memory, and according to device priority information indicating a priority rank for the plurality of memory devices connected to the cache memory.

In accordance with embodiments of the present invention, the control device ejects data from the cache memory according to the data having the lowest priority rank in the memory device having the lowest priority based on information indicating the memory device having the lowest priority rank of the plurality of memory devices connected to cache memory, and according to data priority information indicating the lowest priority rank of the data retained in the memory device having the lowest priority rank.

In accordance with embodiments of the present invention, the control device ejects data from the cache memory and adds new data to the cache memory according to the data having the lowest priority rank of the data stored in a memory device other than a memory device where the newly added data are stored, based on the cache data information, the data priority information and the device priority information.

Objects and advantages of the present invention are achieved with a memory system comprising a memory device including a plurality of storage devices to store data in block units; a cache memory connected to the plurality of storage devices to store a portion of the data stored in the plurality of storage devices; and a control device to concurrently monitor the plurality of storage devices and the blocks of data stored in the storage devices to control transfer of data between the storage device and the cache memory.

In accordance with embodiments of the present invention, the control device assigns a priority rank to the plurality of storage devices and assigns a priority rank to the blocks of data stored in the storage devices to concurrently monitor the storage devices and the blocks of data.

In accordance with embodiments of the present invention, each of the storage devices include a plurality of logical storage devices in which data is stored in block units, and the control device controls ejection of data from the cache memory to maximize the probability that different logical storage devices allocated to the same physical storage device can be simultaneously accessed.

In accordance with embodiments of the present invention, the control device further comprises a cache memory monitoring device to monitor priority of data stored in the cache memory.

In accordance with embodiments of the present invention, the control device may comprise a memory monitoring device to monitor priority of the plurality of storage devices connected to the cache memory; and a data monitoring device to monitor priority of the blocks of data stored in the plurality of storage devices.

In accordance with embodiments of the present invention, the memory monitoring device assigns a highest priority to a storage device which stores data for which access has been requested.

In accordance with embodiments of the present invention, the data monitoring device assigns a highest priority to a block of data for which access has been requested.

In accordance with embodiments of the present invention, the memory monitoring device assigns a priority to a storage device according to frequency of access to the storage devices, and the data monitoring device assigns priority to a block of data according to frequency of access to the blocks of data.

In accordance with embodiments of the present invention, to eject data from the cache memory the memory monitoring device determines the storage device with the lowest priority, and the data monitoring device determines the block of data with the lowest priority which is retained in the storage device having the lowest priority as a block to be ejected.

Objects and advantages of the present invention are achieved with a method of accessing data stored in a memory system including a plurality of storage devices to store blocks of data and a cache memory connected to the plurality of storage devices to store a portion of the data stored in the storage devices, comprising concurrently monitoring the plurality of storage devices and the blocks of data stored in the logical storage devices to control transfer of data between the storage device and the cache memory.

In accordance with embodiments of the present invention, the concurrently monitoring comprises the plurality of storage devices and the blocks of data stored in the logical storage devices comprises monitoring priority of the plurality of storage devices connected to the cache memory; and monitoring priority of the blocks of data stored in the plurality of storage devices.

In accordance with embodiments of the present invention, the method of accessing data may further comprise determining a storage device having the lowest priority; determining a block of data having a lowest priority of the blocks of data stored in the storage device having the lowest priority; and ejecting the block of data determined to have the lowest priority of the blocks of data stored in the storage device having the lowest priority.

BRIEF DESCRIPTION OF THE DRAWINGS

The above and other objects and advantages of the present invention will become apparent and more readily appreciated from the following description of the preferred embodiments, taken in conjunction with the accompanying drawings, of which:

FIGS. 5A and 5B are diagrams showing an example of tables specifying device priority information in accordance with embodiments of the present invention.

FIGS. 6A and 6B are diagrams showing an example of tables specifying data priority information in accordance with embodiments of the present invention.

DESCRIPTION OF THE PREFERRED EMBODIMENTS

Figure 1:
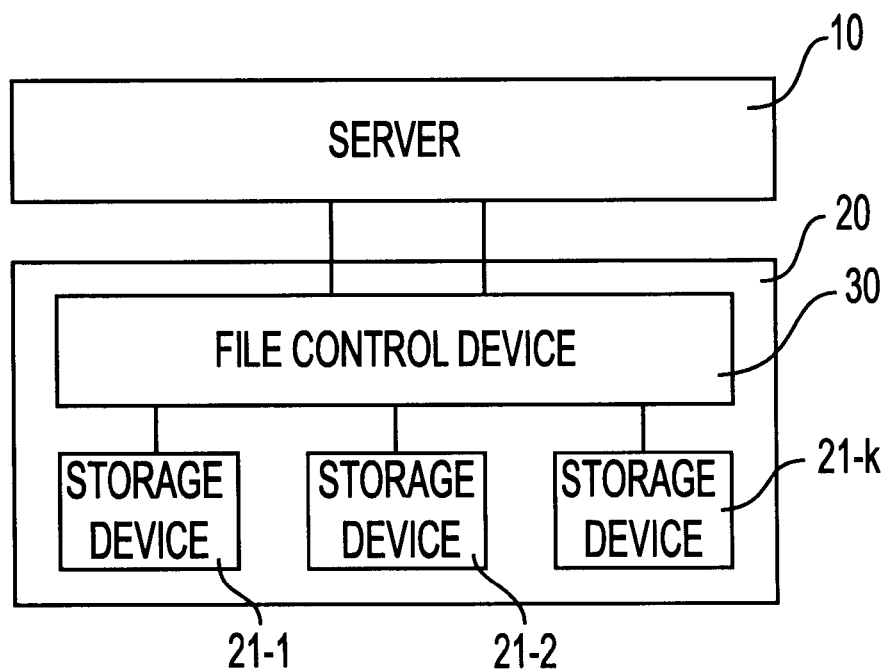
FIG. 1 is a block diagram of the overall configuration of a computer system in accordance with embodiments of the present invention.

Reference will now be made to the present preferred embodiments of the invention, examples of which are illustrated in the accompanying drawings, wherein like reference numerals refer to like elements throughout.

FIG. 1 is a block diagram illustrating the overall configuration of a computer system in accordance with embodiments of the present invention. As shown in FIG. 1, the computer system comprises a server 10, which performs data access, and a storage device 20. The storage device 20 includes storage devices 21-1 to 21-k and a file control device 30.

When there is a request from the server 10 to the storage device 20 for a data read, the file control device 30, which is provided inside storage device 20, reads the data from the storage device 20 and sends the data to the server 10. When there is a request from the server 10 to the storage device 20 for a data write, the file control device 30 writes the data to the storage device 20.

As shown in FIG. 1, a number k of physical storage devices 21 are connected to the file control device 30. When there is a request from the server 10 for a data write to the storage device 20, the file control device 30 selects a target storage device and a write to the relevant storage device is performed.

Figure 2:
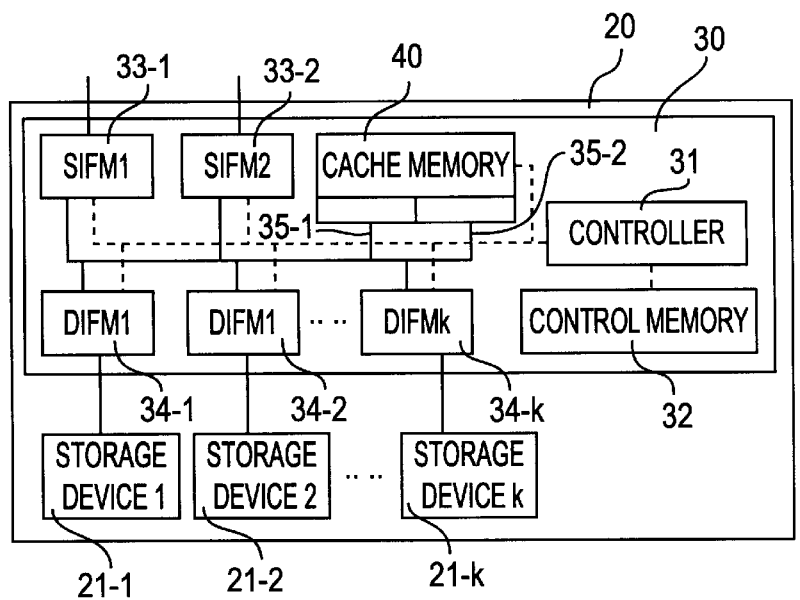
FIG. 2 is a block diagram of a storage device in accordance with embodiments of the present invention.

FIG. 2 is a block diagram of the storage device 20 in accordance with embodiments of the present invention. As shown in FIG. 2, the storage devices 21-1 to 21-k store data, and the file control device 30 controls storage devices 21-1 to 21-k.

The file control device 30 includes a controller 31 to control the entire file control device 30, a control memory 32 in which a source control condition monitored by the controller 31 is recorded, a module SIFM 33 which controls the interface with the server 10, and a module DIFM 34 which controls the interface with the storage devices 21. The file control device 30 may also include a plurality of SIFM 33-1, 33-2 and DIFM 34-1 to 34-k.

The file control device 30 also includes a cache memory 40 which is used to store part of the data which is stored in the storage device 21. The storage device 21 may be a magnetic disk, an optical disk or other types of disk devices.

When there is a request from the server 10 for access to the storage device 20, the file control device 30 first confirms whether or not the data to be accessed is stored in cache memory 40. If the data to be accessed is stored in cache memory 40, the data from cache memory 40 is used for a request for access from the server 10. If the data to be accessed is not stored in the cache memory 40, processing is performed according to the type of access from the server 10 as described below.

When the data access is a data read operation, and the data to be accessed is not stored in cache memory 40, the file control device 30 reads the data to be accessed from the storage device 21 and transfers it to the server 10. At this time, the file control device 30 stores the data read from the storage device 21, and also stores the data read from storage device 21 in the cache memory 40. The file control device 30 is provided for access as follows.

When the data access is a data write operation, and the data to be accessed is not stored in cache memory 40, the file control device 30 writes data to the cache memory 40. The file control device 30 writes back the data written to the cache memory 40 to the storage device 21 at the appropriate time.

The capacity of the cache memory 40 is less than the storage capacity of all the storage devices 21-1 to 21-k. Therefore, the file control device 30 must eject data stored in the cache memory 40. Ejection of data and new data storage is carried out in specific data units.

In accordance with the present preferred embodiment of the invention, monitoring of the data in cache memory 40 is preferably performed using the LRU system. As described herein, data entries with the highest priority are disposed at the upper portion of the table which stores cache memory monitoring information.

If there are multiple access buses, that is, path 35 to interface SIFM 33 and cache memory 40 for the server 10, the server 10 can be accessed at the same time for multiple data stored in cache memory 40. At this time, as long as at least some of the data to be accessed exist in the cache memory 40, the server 10 can simultaneously access different logical storage devices which have been allocated to the same physical storage device.

Figure 3:
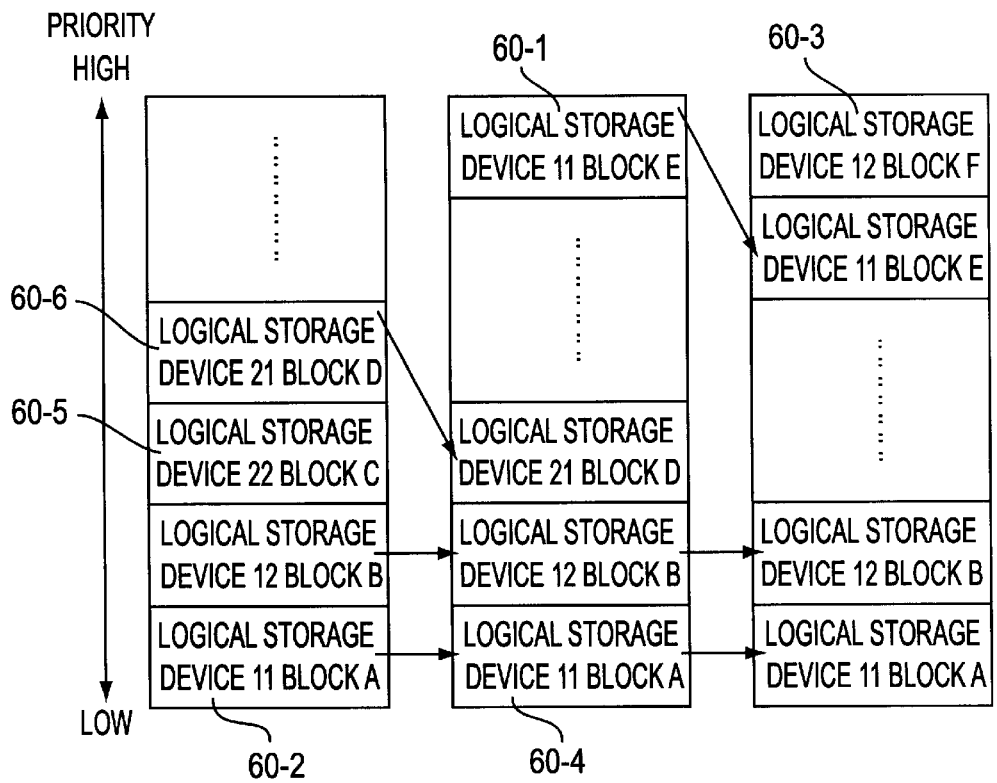
FIG. 3 is a diagram illustrating transition of contents of a cache memory monitoring table in accordance with embodiments of the present invention.
Figure 4:
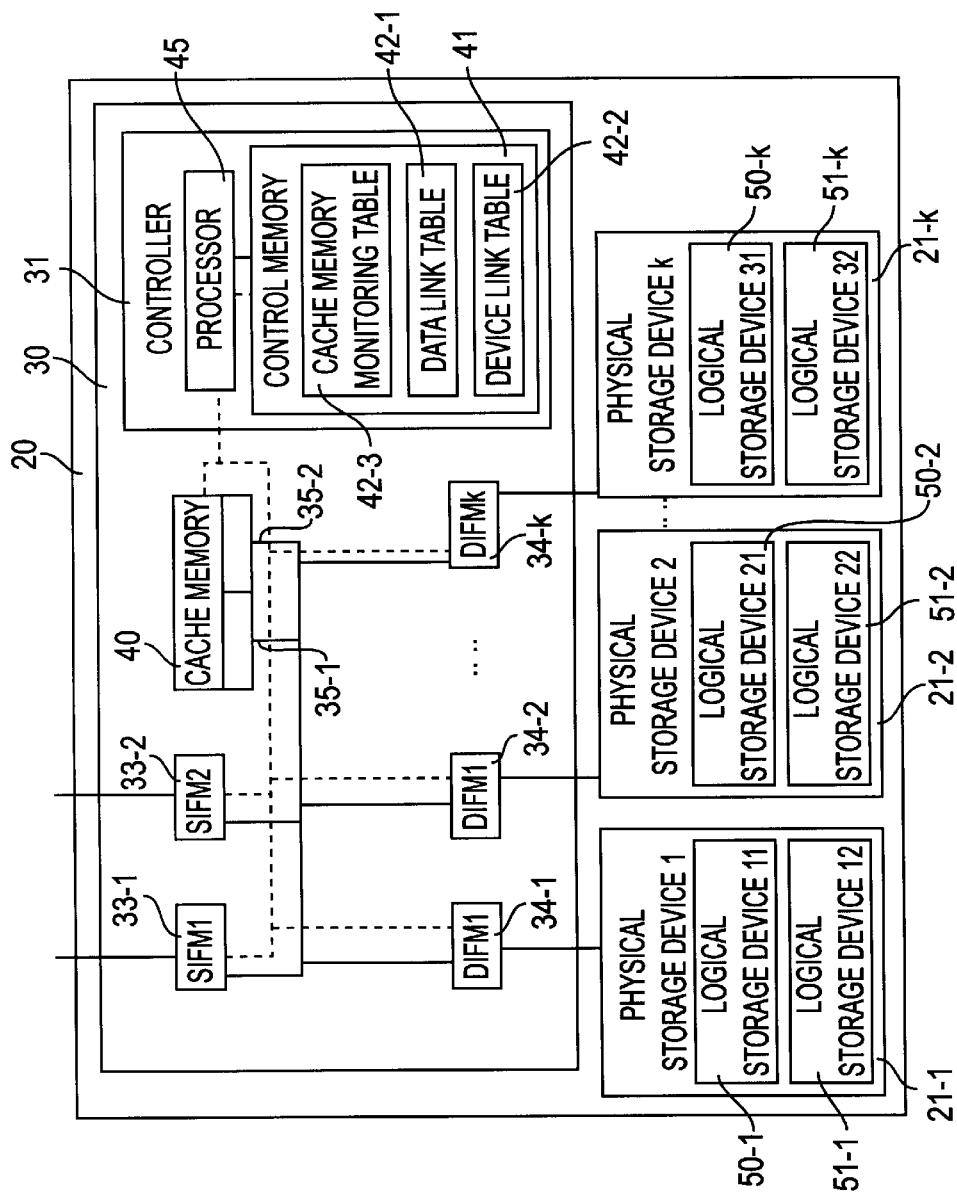
FIG. 4 is a block diagram of a storage device in accordance with embodiments of the present invention.

FIG. 3 is a diagram illustrating transition of the contents of a cache memory monitoring table 42-3 (FIG. 4) in accordance with embodiments of the present invention. FIG. 4 is a block diagram of a storage device 20 in accordance with embodiments of the present invention.

The data stored in the cache memory 40 are arranged with the priority indicated on the left hand side of FIG. 3. As shown in FIG. 3, a new entry 60-1, which corresponds to block E of logical storage device 11 (50-1) is added to the cache memory monitoring table 42-3.

The physical storage device 1 (21-1) includes the logical storage device 11 (50-1) and the logical storage device 12 (51-1). As a result, in accordance with embodiments of the present invention, block data retained in a physical storage device other than the physical storage device 1 (21-1) are ejected from cache memory 40. Thus, the possibility of the block data of logical storage device 11 (50-1) and logical storage device 12 (51-1) being ejected diminishes.

For example, as shown on the left-hand side of FIG. 3, if block C (60-5) of logical storage device 22 (51-2) and block D (60-6) of logical storage device 21 (50-2) having the lowest priority other than the logical storage devices which are configured in physical storage device 1, and new entries 60-1 (block E) and 60-3 (block F) are added to the cache memory monitoring table 42-3, then the contents of the cache memory monitoring table 42-3 will change as indicated on the right hand side of FIG. 3. Thus, the file control device 30 can simultaneously handle a request for access to block A of logical storage device 50-1 and block B of logical storage device 51-1, as shown on the right hand side of FIG. 3.

Therefore, the file control device in accordance with embodiments of the present invention uses concurrent monitoring of the block of the logical storage device and of the physical storage device. This makes it possible to prevent a diminishing of the possibility of simultaneous access.

FIG. 4 is a block diagram of a storage device 20 in accordance with embodiments of the present invention. As shown in FIG. 4, the storage device 20 includes a file control device 30, two SIFM (33-1 and 33-2), k DIFM (34-1 to 34-k), k physical storage devices (21-1 to 21-k), and two access buses (35-1 and 35-2) to cache memory 40. As shown in FIG. 4, a single physical storage device 21 comprises two logical storage devices 50, 51.

The file control device 30 includes a controller 31 which is provided in the storage device 20. The controller 31 comprises a control memory 41 and a processor 45. The control memory 41 includes a data link table 42-1, a device link table 42-2 and a cache memory monitoring table 42-3. The data link table 42-1 contains data priority information; the device link table 42-2 contains device priority information; and the cache memory monitoring table 42-3 contains cache data priority information. The processor 45 operates according to a program stored in the control memory 41 and controls the overall file control device 20.

FIGS. 5A and 5B are diagrams of device link tables 42-2 specifying device priority information in accordance with embodiments of the present invention. The tables shown in FIGS. 5A and 5B are used to monitor the physical storage device units. Physical storage device entries are arranged in these tables.

In the tables shown in FIGS. 5A and 5B, one row is a single entry. One entry indicates a single set of physical storage device information. An "entry number" is attached in ascending order to each of the entries. Three entries are shown in FIG. 5. In accordance with the present invention, there are many offset values from an indicated memory address. As a result, the physical storage device, which is the retention address for the data which are stored in cache memory 40, means that there are at most three physical device storage units.

"Device number" indicates the number of the physical storage device. As shown in FIGS. 5A and 5B, entry number 0 includes information regarding physical storage device 1, entry number 1 includes information regarding physical storage device 2, and entry number 2 includes information regarding physical storage device 3.

"Previous" indicates an entry number having a priority which is higher than the current entry. "Latter" indicates an entry number having a priority which is lower than the current entry. Therefore, a null value (indicated by "*" in FIGS. 5A and 5B) is set at "previous" in the entry with the highest priority. The null value is preferably a value with all bits on. A null value is also set in the "latter" part of the entry with the lowest priority.

As shown in FIG. 5A, it can be seen that the physical storage device 1 has the highest priority, the physical storage device 3 has the next highest priority and the physical storage device 2 has the lowest priority.

FIGS. 6A and 6B are diagrams illustrating an example of the data link table 42-1 specifying the data priority information in accordance with embodiments of the present invention.

The tables shown in FIGS. 6A and 6B are used to monitor block units. Block entries are arranged in the tables. As described herein, a "block" is a copy of part of the data retained in the storage device 20.

In the tables shown in FIGS. 6A and 6B, a single row indicates a single entry in a manner similar to the device priority information shown in the device link tables 42-2 of FIGS. 5A and 5B. Furthermore, a single entry indicates a single block of information.

"Entry numbers" are attached to each of the entries in ascending order. The entry number is oftentimes an offset value from an indicated memory address. Four entries are shown in FIGS. 6A and 6B. The four entries indicate that four blocks have been stored in cache memory 40.

"Physical device number" indicates the physical storage device number in which the block is retained. "Logical device number" indicates the logical storage device number in which the block is retained. If the relationship between the "physical storage device" and the "logical storage device" is clarified by referring to other tables, the "logical device number" is not necessary information for the data priority information. However, in accordance with embodiments of the present invention, the data priority information also indicates the relationship between the "physical storage device" and the "logical storage device."

As shown in the FIGS. 6A and 6B, logical storage devices 11 and 12 are both configured in physical storage device 1. However, logical storage devices 11 and 12 can be recognized by referencing entry 0 and entry 1, respectively. Furthermore, the fact that the physical storage device 2 includes both logical storage devices 21 and 22 can be recognized by referring to entry 2 and entry 3 in FIGS. 6A and 6B.

"Block" indicates the block which is stored in cache memory 40. For purposes of explanation, the respective blocks are identified herein with letters "A", "B", "C", "D". However, the respective blocks can be identified with numbers. The block identifier is attached to each of the data retained in the logical storage device.

As shown in FIGS. 6A and 6B, entry 0 is information relating to block A which is retained in logical storage device 11 which is configured in the physical storage device 1.

"Previous" and "latter" have the same meaning as used for the device priority information in FIGS. 5A and 5B. As shown in FIG. 6A, the priority, in descending order, is block C of logical storage device 21, block D of logical storage device 22, block B of logical storage device 12 and block A of logical storage device 11.

In operation of the file control device 30, if the data for which read is requested by the server 10 is stored in cache memory 40, the data are transferred from cache memory 40. If the data for which read is requested by the server 10 are not stored in cache memory 40, the data are read from the storage device and transferred.

If the data for which write has been requested by the server 10 are stored in cache memory 40, the file control device 30 updates the data stored in cache memory 40 using the data for which write is requested by server 10. If the data for which write has been requested by server 10 are not stored in cache memory 40, the file control device 30 immediately reads the data from the storage device to cache memory 40 and records the data. Thereafter, the file control device 30 updates the data recorded in cache memory 40 using the data transferred from server 10.

Alternatively, the file control device 30 may take the data for which write is requested by the server 10 and write the data directly to cache memory 40 without reading the data from the storage device. The updated data in cache memory 40 may be written back to the storage device when, for example, the block containing those data is ejected from the cache memory 40.

In accordance with preferred embodiments of the present invention, monitoring of the entries in cache memory 40 is performed using the LRU system. Controller 31 provides the highest priority in the device priority information in table 42-2 for the physical storage device entry which contains the block for which read and write have been requested.

For example, in the state of the device priority information in device link table 42-2 shown in FIG. 5B, access is considered to have been given to the physical storage device 3. In this case, the highest priority is given to entry 2 which corresponds to the physical storage device 3. Therefore, controller 31 sets a null value in the "previous" part of the entry 2 and sets 0 in the "latter" part of the entry. Entry 0 is an entry which had the highest priority (see FIG. 5A) before access to physical storage device 3 was granted. The controller 31 sets 2 at the "previous" part of entry 0. Entry 2 is an entry which increases the highest priority in this instance.

Next, the controller 31 sets entry 1, which was set at "latter" in the original entry 2, to the "latter" part of entry 0, which was originally "previous" in entry 2. Controller 31 sets entry 0, which was originally "previous" in entry 2, to the "previous" part of entry 1, which was originally "latter" in entry 2. The priority change is thereby completed. In the state shown in FIG. 5B, the priority, in descending order, is "device 3, device 1, device 2."

The controller 31 assigns the highest priority of the data priority information in table 42-1 (FIGS. 6A and 6B) to the block entry for which there have been and read and write requests. For example, as shown in the table of FIG. 6B, there has been access to block A of logical storage device 11. In this case, controller 31 assigns the highest priority to entry 0 which corresponds to block A of logical storage device 11. Therefore, the controller 31 sets a null value (*) in the "previous" entry of entry 0 and sets "2" in the "latter" entry of entry 0. Entry number 2 is the entry which had the highest priority before access to block A of logical storage device 11 was issued. The controller 31 sets "0" in the "previous" entry of entry 2. Thus, entry number 0 is the entry which increases in priority in this instance.

Next, the controller 31 sets a null value (*), which was "latter" in the original entry 0, to "latter" in entry number 1 which was "previous" in the original entry 0. The changing of the priority is thereby completed.

The table which specifies the data priority information takes the form as indicated in FIG. 6B. In the condition shown in FIG. 6B, the priority is, in descending order, block A of logical storage device 11, block C of logical storage device 21, block D of logical storage device 22 and block B of logical storage device 12.

When the entire cache memory 40 is in use, when a new block is required because of a read or write request from the server 10, the controller 31 performs the following processing. Specifically, the controller 31 finds the physical storage device entry with the lowest priority in the device priority information in device link table 42-2. In accordance with embodiments of the present invention, when the table 42-2 which specifies the device priority information is in the condition shown in FIG. 5A, the target block becomes physical storage device 2.

Next, the controller 31 detects the block with the lowest priority which is retained in the physical storage device 2 by referring to the data priority information in data link table 42-1. In accordance with embodiments of the present invention, the table specifying the data priority information has the status shown in FIG. 6A.

The controller 31 retrieves the data priority information starting with the lowest priority. The entry with the lowest priority in FIG. 6A is entry 0. Nevertheless, entry 0 is an entry for the physical storage device 1. Therefore, entry 0 is not targeted,.

The entry with next lowest priority is entry 1. However, entry 1 is also an entry for physical storage device 1 and is not targeted. The entry with the next lowest priority is entry 3. This is an entry for the physical storage device 2. Therefore, block D of logical storage device 22, which is indicated in the relevant entry and is the block with the lowest priority retained in physical storage device 2, is to be ejected. Last of all, the controller 31 frees the space in cache memory 40 which the target data (block D) are occupying and uses the memory for the new block. At this time, if the data which are stored in the freed memory are updated, the controller 31 write returns the relevant data to the storage device 20.

Furthermore, as a result of the above-described processing, the block in the logical storage device which is contained in a certain physical storage device is completely ejected from cache memory 40. In this case, the controller 31 ejects the physical storage device from the device priority information. Thus, a useless entry is omitted from the device priority information. When this ejection takes place, the controller 31 can reduce the retrieval time of the device priority information.

Conversely, when a new entry is added to the data priority information, an entry for the physical storage device which contains the corresponding logical storage device is considered not to have existed in the device priority information. In this case, the controller 31 must add an entry for the physical storage device to the device priority information.

A processing protocol performed by controller 31 when an access request is received from the server 10 will now be described below with reference to the flow chart shown in FIG. 7.

Figure 7:
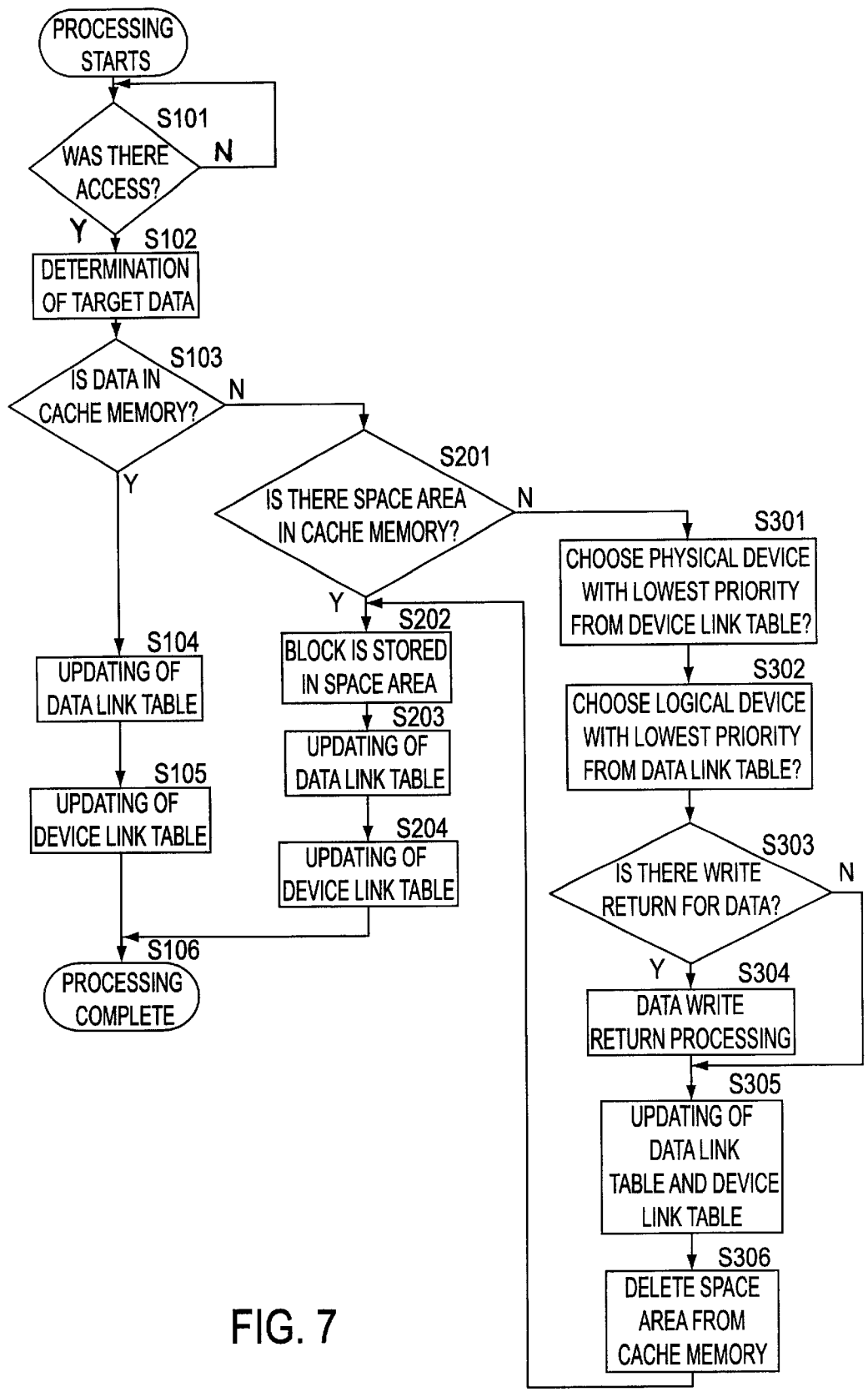
FIG. 7 is a flowchart illustrating an operational process for performing file control in accordance with embodiments of the present invention.

As shown in FIG. 7, first, the controller 31 detects an access request from the server 10 by notification from the SIFM (step S101). The controller 31 then recognizes target data to be accessed (step S102) which is announced from the server. The controller 31 then references data priority information in data link table 42-1 and determines whether or not the data to be accessed is stored in cache memory (step S103).

If the data to be accessed are stored in cache memory, then the controller 31 updates the data priority information in table 42-1 (step S104), updates the device priority information in table 42-2 (step S105) and processing is completed. In accordance with preferred embodiments of the present invention, LRU control is used to monitor the priority. Updating of the data priority information in the data link table 42-1 specifically means changing the priority of the data to be accessed to the highest priority. Updating of the device priority information in the device link table 42-2 specifically means changing the priority of the physical storage device in which the data to be accessed are retained to the highest priority. Thus, processing for the controller is finished (step S106).

However, when the data to be accessed are not stored in the cache memory 40, the controller 31 performs processing by cataloguing the relevant data in cache memory 40. Specifically, when the data to be accessed are not stored in cache memory 40, the controller 31 first determines whether or not there are any unused areas in cache memory 40 by cataloguing the data again inside cache memory 40 (step S201). If there are any unused areas in cache memory 40, the controller 31 indicates to DIFM the unused areas in which the target data are stored (step S202). After the data storage is completed, the controller 31 updates the data priority information in data link table 42-1 (step S203), updates the device priority information in device link table 42-2 (step S204) and processing is completed.

In accordance with embodiments of the present invention, LRU control is used to monitor the priority. Because LRU control is used, updating of the data priority information specifically means adding data to be accessed to the table 42-1 as data with the highest priority. Updating of the device priority information specifically means that the controller 31 adds to the device link table 42-2 a physical storage device in which the data to be accessed is located as a device with the highest priority. Alternatively, updating of the device priority information means that when the relevant physical storage device is catalogued in the device priority information in device link table 42-2, the controller 31 gives the highest priority to the physical storage device in which the data to be accessed are retained. Thus, processing with the controller 31 is completed (step S106).

When there are no unused areas in cache memory 40 such that new data can be catalogued, controller 31 performs processing as follows. The controller 31 first retrieves the device priority information and the physical storage device with the lowest priority from the device link table 42-2 (step S301). The controller 31 then retrieves and ejects the data priority information from the data link table 42-1, by retrieving and ejecting the data from the logical storage device with the lowest priority out of the data which are retained in the physical device which has been determined as the target device (step S302).

The controller 31 validates whether or not the data to be ejected are updated in cache memory 40. In other words, the controller 31 validates whether the data stored in cache memory 40 and the data in the storage device are different. If the data are different, the controller 31 determines whether write-back (write return) of the data is necessary (step S303).

When the controller 31 has determined that data write return is necessary, the controller 31 indicates to DIFM write return for the relevant data (step S304). The controller 31 then updates data priority information in the data link table 42-1 and device priority information in the device link table 42-2 (step S305) and processing is completed.

In accordance with embodiments of the invention, LRU control is used to monitor the priority. As a result, updating the data priority information specifically means that the data determined for ejection are to be ejected by the controller 31 from the table 42-1. Updating device priority information specifically means that the controller 31 will eject from the table 42-2 an entry in a physical storage device in which data to be ejected are retained. However, It the relevant data are restricted to the case when they are the last of the data transferred from the physical storage device in which the relevant data are retained to the cache memory 40. In all other cases, no updating of the device priority information is necessary.

After updating of the data priority information has been completed, the controller 31 frees cache memory 40 which has been monopolized by the target data so that ejection of the target data is completed (step S306). Thus, an unused area is generated in cache memory 40.

Thereafter, the same type of processing as performed for adding data to cache memory 40 is performed, and a detailed description will not be repeated here.

The description above focuses on how the ejection of data from cache memory 40 is generated when new data are stored in cache memory 40. However, in accordance with embodiments of the present invention, data is not only eject data in this case. For example, the present invention is also applicable to the case when the controller 31 periodically ejects data from the cache memory 40. In this case, the controller 31 performs the processing of step S301 through step S306 shown in FIG. 7.

As described above with respect to the first preferred embodiment of the invention, control of access to a storage device is performed by completely separating the physical storage device from the logical storage device. As a result, it is possible to configure multiple logical storage devices in a single physical storage device.

Figure 8:
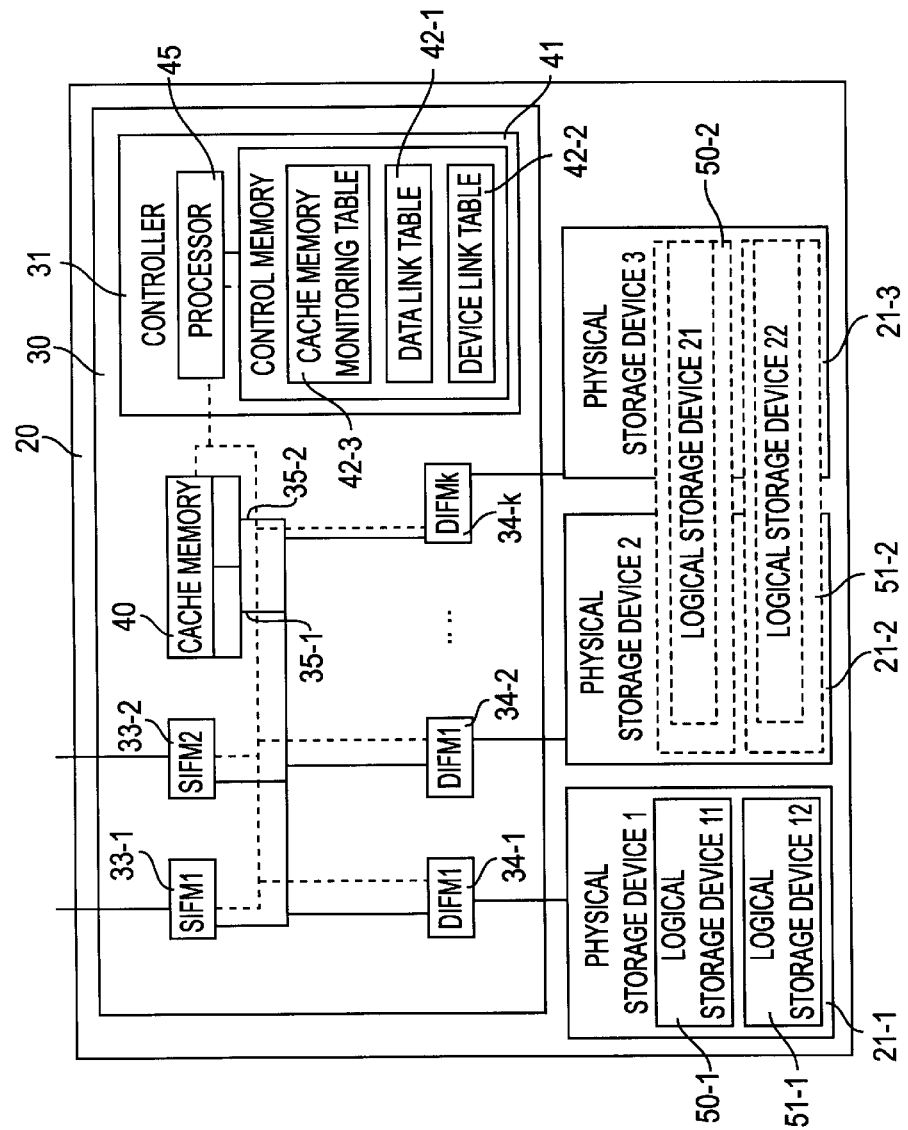
FIG. 8 is a diagram showing a file control device in accordance with embodiments of the present invention this invention.
Figure 9:
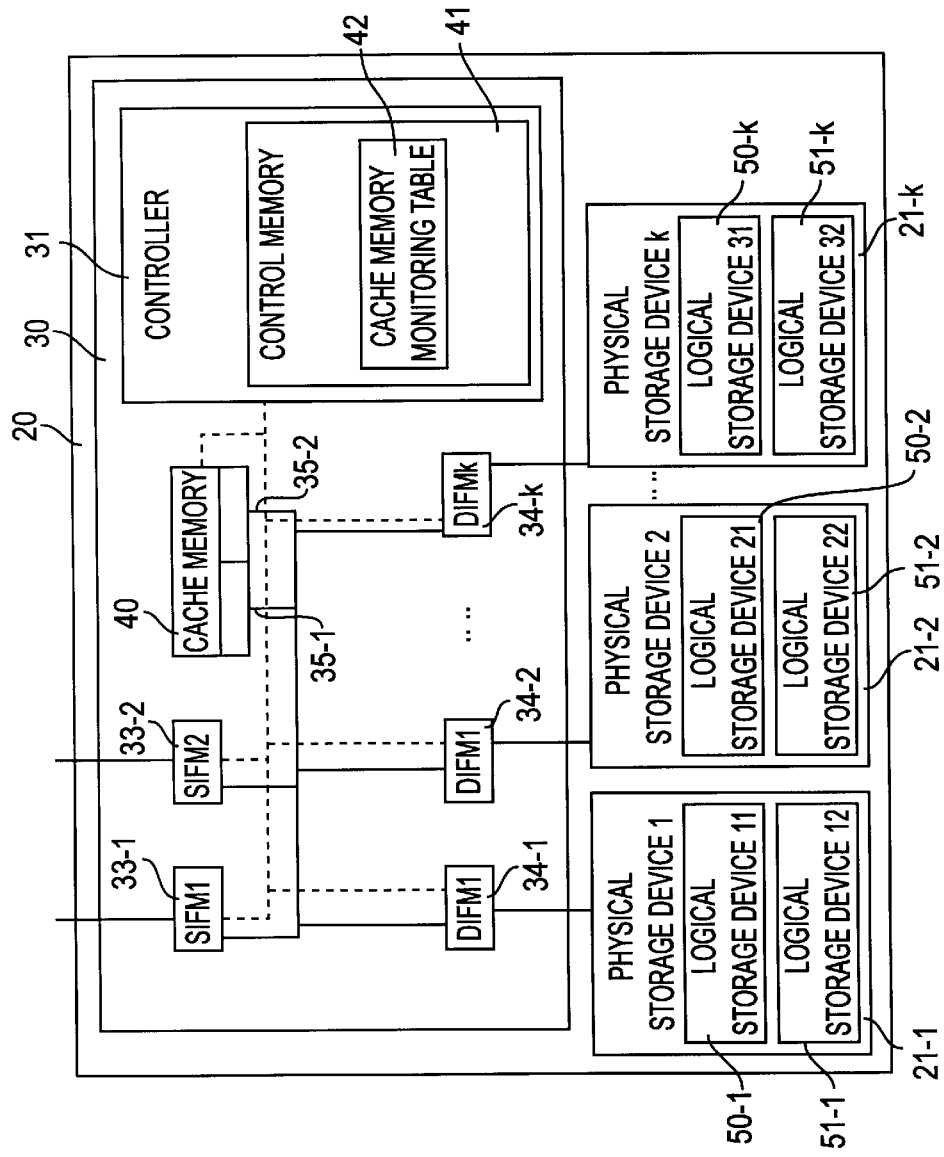
FIG. 9 is a diagram of a prior art file control device.
Figure 10:
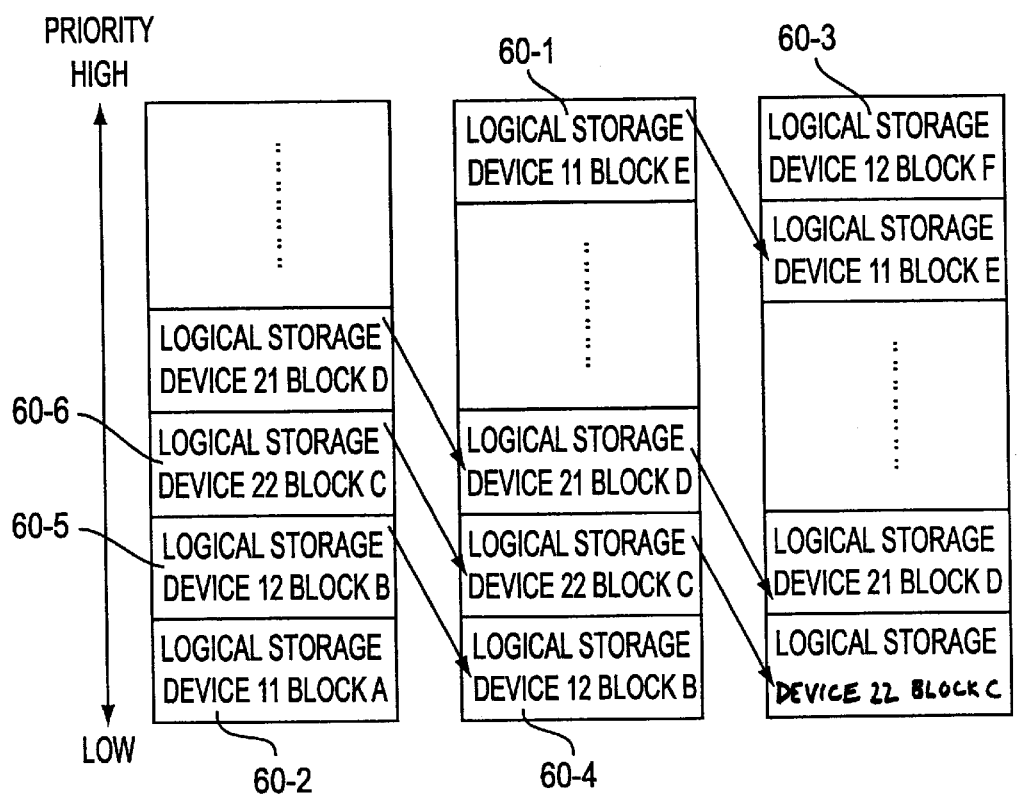
FIG. 10 is a diagram showing transition of contents of a prior art cache memory monitoring table.

Furthermore, as shown in FIG. 8, in accordance with embodiments of the present invention, a plurality of logical storage devices can be configured in multiple physical storage devices. As shown in FIG. 8, the logical storage device 50-2 is configured astride physical storage devices 21-2 and 21-3. More particularly, the data retained in logical storage device 50-2 is split between physical storage devices 21-2 and 21-3 and then recorded. Similarly, the data retained in logical storage device 51-2 is split between physical storage devices 21-2 and 21-3 and then recorded.

The concepts of data priority information and device priority information are the same as described above when the present invention is applied to a storage device having the structure shown in FIG. 8, and no changes are required for handling data priority information and device priority information.

The second preferred embodiment of the present invention will be described in more detail below with reference to FIG. 7.

In accordance with the second preferred embodiment of the invention, the controller 31 updates device priority information in device link table 42-2 (step S105). Updating of the device priority information means giving the highest priority to a physical storage device in which the data to be accessed are retained. In accordance with the second preferred embodiment, the physical storage device is not specified as a single device even if a logical storage device is determined. However, the data priority information indicates the physical storage device in which the data stored in cache memory 40 are retained. Therefore, a good idea of the physical storage device in which the data to be accessed are stored can be obtained by referencing the data priority information.

Meanwhile, the data to be accessed are not stored in cache memory 40. If an unused area exists in cache memory 40 merely by being able to catalog the data anew, after the data storage has been completed, the controller 31 updates the device priority information in device link table 42-2 (step S204). Even in this case, it is possible that the controller 31 can get a good idea of the physical storage device in which the data to be accessed are stored by referring to the data priority information.

When data are ejected from cache memory 40, controller 31 updates the device priority information in device link table 42-2 (step S305) and processing is completed. Updating of the device priority information means the controller 31 ejects from the table 42-2, the entry of the physical storage device in which the data to be ejected are retained. However, this type of data is restricted to when these are the last of the data transferred to cache memory 40 from the physical storage device in which the data are retained. In other cases, the device priority information need not be updated. Even in this case, the controller 31 references the data priority information so that it is possible to get a good idea of the physical storage device in which the data to be accessed are stored, thus achieving the objective of the present invention.

By monitoring a block inside cache memory 40 in the above-described manner, data retained in a physical storage device with the lowest frequency of use are ejected from cache memory starting from the lowest frequency of use.

Therefore, data retained in a logical storage device which is built into a physical storage device with a high frequency of use can lessen the possibility of being ejected from cache memory 40. Furthermore, it is possible to avoid competition for reading data relative to multiple logical devices built into a single storage device.

When storing new data to cache memory 40, read and write return for the same physical device makes it possible to avoid any competition. As a result, the present invention improves the possibility of simultaneous access for a server and makes data access more efficient.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A file control device, comprising:
   a storage device to store data, the storage device including a plurality of memory devices;
   a cache memory, connected to the plurality of memory devices, to store a portion of the data stored in the storage device; and
   a control device to control transfer of data between the storage device and the cache memory,
   wherein the control device controls data transfer between the storage device and the cache memory according to cache data information indicating a relationship between a location in the storage device where the portion of the data is stored and a location in the cache memory where the portion of the data is to be retained, and according to data priority information indicating a priority rank for the data stored in the cache memory, and according to device priority information indicating priority ranks for memory devices of the plurality of memory devices that have data in the cache memory.

2. A file control device as recited in claim 1, wherein the control device ejects from the cache memory data that has the lowest priority rank and that resides in the memory device having the lowest priority, where the ejected data is selected based on information indicating a memory device having a lowest priority rank of the plurality of memory devices connected to the cache memory, and is also selected according to data priority information indicating a lowest priority rank of data retained in the memory device having the lowest priority rank.

3. A file control device as recited in claim 1, wherein the control device ejects data from the cache memory and adds new data to the cache memory according to the data having the lowest priority rank of the data stored in a memory device other than a memory device where the newly added data are stored, based on the cache data information, the data priority information and the device priority information.

4. A memory system, comprising:
   a memory device including a plurality of storage devices to store data in block units;
   a cache memory connected to the plurality of storage devices to store a portion of the data stored in the plurality of storage devices; and a control device monitoring frequency of access to each of the plurality of storage devices and separately monitoring access to the blocks of data stored in the storage devices and, according to both monitorings, controlling transfer of data between the storage device and the cache memory, wherein the control device controls ejection of data from the cache memory to maximize the probability that different logical storage devices allocated to the same physical storage device can be simultaneously accessed.

5. A memory system, comprising:

a memory device including a plurality of storage devices to store data in block units;

a cache memory connected to the plurality of storage devices to store a portion of the data stored in the plurality of storage devices; and a control device monitoring access to the plurality of storage devices and monitoring access to the blocks of data stored in the storage devices and, according to the monitoring, controlling transfer of data between the storage device and the cache memory, wherein the control device assigns a priority rank to the plurality of storage devices and assigns a priority rank to the blocks of data stored in the storage devices to concurrently monitor the storage devices and the blocks of data.

6. A memory system, comprising:

a memory device including a plurality of storage devices to store data in block units;

a cache memory connected to the plurality of storage devices to store a portion of the data stored in the plurality of storage devices; and a control device monitoring access to the plurality of storage devices and separately monitoring access to the blocks of data stored in the storage devices and, according to both monitorings, controlling transfer of data between the storage device and the cache memory, wherein each of the storage devices include a plurality of logical storage devices in which data is stored in block units, wherein the control device controls ejection of data from the cache memory to maximize the probability that different logical storage devices allocated to the same physical storage device can be simultaneously accessed.

7. A memory system as recited in claim 4, wherein the control device further comprises a cache memory monitoring device to monitor priority of data stored in the cache memory.

8. A memory system as recited in claim 4, wherein the control device comprises:

a memory monitoring device to monitor priority of the plurality of storage devices connected to the cache memory; and a data monitoring device to monitor priority of the blocks of data stored in the plurality of storage devices.

9. A memory system, comprising:

a memory device including a plurality of storage devices to store data in block units;

a cache memory connected to the plurality of storage devices to store a portion of the data stored in the plurality of storage devices; and a control device monitoring access to the plurality of storage devices and monitoring access to the blocks of data stored in the storage devices and, according to the monitoring, controlling transfer of data between the storage device and the cache memory wherein the control device comprises:

a memory monitoring device to monitor priority of the plurality of storage devices connected to the cache memory; and a data monitoring device to monitor priority of the blocks of data stored in the plurality of storage devices, and wherein the memory monitoring device assigns a highest priority to a storage device which stores data for which access has been requested.

10. A memory system as recited in claim 8, wherein the data monitoring device assigns a highest priority to a block of data for which access has been requested.

11. A memory system, comprising:

a memory device including a plurality of storage devices to store data in block units;

a cache memory connected to the plurality of storage devices to store a portion of the data stored in the plurality of storage devices; and a control device monitoring access to the plurality of storage devices and monitoring access to the blocks of data stored in the storage devices and, according to the monitoring, controlling transfer of data between the storage device and the cache memory wherein the control device comprises:

a memory monitoring device to monitor priority of the plurality of storage devices connected to the cache memory; and a data monitoring device to monitor priority of the blocks of data stored in the plurality of storage devices, and wherein the memory monitoring device assigns a priority to a storage device according to frequency of access to the storage devices, and the data monitoring device assigns priority to a block of data according to frequency of access to the blocks of data.

12. A memory system as recited in claim 11, wherein to eject data from the cache memory the memory monitoring device determines the storage device with the lowest priority, and the data monitoring device determines the block of data with the lowest priority which is retained in the storage device having the lowest priority as a block to be ejected.

13. A method of accessing data stored in a memory system comprising a plurality of storage devices to store blocks of data and a cache memory connected to the plurality of storage devices to store a portion of the data stored in the storage devices, comprising:

monitoring frequency of access to each of the plurality of storage devices and separately monitoring access to the blocks of data stored in the storage devices and, according to both monitorings, controlling transfer of data between the storage device and the cache memory by storing an entry in a least recently used cache of a storage area in a storage device of the plurality of storage devices, wherein the storage device has a lowest priority.

14. A method as recited in claim 13, wherein the concurrently monitoring comprises:

monitoring priority of the plurality of storage devices connected to the cache memory; and monitoring priority of the blocks of data stored in the plurality of storage devices.

15. A method of accessing data stored in a memory system comprising a plurality of storage devices to store blocks of data and a cache memory connected to the plurality of storage devices to store a portion of the data stored in the storage devices, comprising:

monitoring access to the plurality of storage devices and monitoring access to the blocks of data stored in the storage devices and, according to the monitoring, controlling transfer of data between the storage device and the cache memory wherein the concurrently monitoring comprises:

monitoring priority of the plurality of storage devices connected to the cache memory; and monitoring priority of the blocks of data stored in the plurality of storage devices, and the method further comprising:

determining a storage device having the lowest priority;

determining a block of data having a lowest priority of the blocks of data stored in the storage device having the lowest priority; and ejecting the block of data determined to have the lowest priority of the blocks of data stored in the storage device having the lowest priority.

16. The apparatus according to claim 4, wherein the monitoring of access to the plurality of storage devices is concurrent with the monitoring of access to the blocks of data stored in the storage devices.

17. The apparatus according to claim 13, wherein the monitoring of access to the plurality of storage devices is concurrent with the monitoring of access to the blocks of data stored in the storage devices.

18. A method of ejecting entries from the cache of a multi-device storage unit, comprising selecting a cache entry from among a group of least recently used cache entries, where the cache entry is selected based on its correspondence to a storage device having a lowest cache priority.

19. A method of controlling a cache, comprising:

storing entries in a cache, where each entry corresponds to a storage area in one of a plurality of storage devices;

prioritizing the storage devices based on recency of their use; and selecting a least recently used cache entry corresponding to a storage area of a low priority storage device.

* * * * *